United States Patent
Cody et al.

(10) Patent No.: US 9,798,823 B2
(45) Date of Patent: Oct. 24, 2017

(54) SYSTEM, METHODS AND COMPUTER PRODUCTS FOR DETERMINING AFFINITY TO A CONTENT CREATOR

(71) Applicant: SPOTIFY AB, Stockholm (SE)

(72) Inventors: Noel Cody, New York, NY (US); Kinshuk Mishra, New York, NY (US); Steve Shirley, New York, NY (US)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 14/943,995

(22) Filed: Nov. 17, 2015

(65) Prior Publication Data
US 2017/0140060 A1    May 18, 2017

(51) Int. Cl.
*G06F 17/30* (2006.01)

(52) U.S. Cl.
CPC .. *G06F 17/30876* (2013.01); *G06F 17/30598* (2013.01)

(58) Field of Classification Search
CPC .............. G06F 17/30598; G06F 17/30876
USPC ......................................... 707/758
See application file for complete search history.

(56) References Cited

U.S. PATENT DOCUMENTS

| | | | |
|---|---|---|---|
| 4,606,002 A | 8/1986 | Waisman et al. | |
| 5,577,249 A | 11/1996 | Califano | |
| 5,799,184 A | 8/1998 | Fulton et al. | |
| 7,075,000 B2 | 7/2006 | Gang et al. | |
| 7,353,235 B2 | 4/2008 | Sally et al. | |
| 7,398,274 B2 | 7/2008 | Ittycheriah et al. | |
| 7,627,605 B1 | 12/2009 | Lamere et al. | |
| 7,769,757 B2 | 8/2010 | Grefenstette et al. | |
| 7,772,478 B2 | 8/2010 | Whitman et al. | |
| 7,783,249 B2 | 8/2010 | Robinson | |
| 7,788,084 B2 | 8/2010 | Brun et al. | |
| 7,860,862 B2 | 12/2010 | Slaney et al. | |
| 7,945,441 B2 | 5/2011 | Thompson et al. | |
| 8,005,724 B2 | 8/2011 | Dunning et al. | |
| 8,050,921 B2 | 11/2011 | Mark et al. | |
| 8,190,556 B2 | 5/2012 | Pappas | |
| 8,385,662 B1 | 2/2013 | Yoon et al. | |

(Continued)

FOREIGN PATENT DOCUMENTS

| | | |
|---|---|---|
| CA | 2253744 A1 | 5/2000 |
| EP | 1675020 A2 | 6/2006 |

(Continued)

OTHER PUBLICATIONS

The Echo Nest Musical Fingerprint—2010, Daniel P.W. Ellis, Brian Whitman, Tristan Jehan, Paul Lamere.

(Continued)

*Primary Examiner* — Joshua Bullock
(74) *Attorney, Agent, or Firm* — Merchant & Gould P.C.

(57) ABSTRACT

Affinity scores are computed for a plurality of user accounts, each affinity score quantifies an affinity of a user account to a content creator of one or more digital objects hosted in a content hosting platform. Each affinity score is computed by collecting interaction data for the user account corresponding to the content creator, normalizing the collected interaction data using a total activity data of the user account on the content hosting platform and attribute data associated with the content creator, and generating the affinity score using the normalized interaction data.

21 Claims, 6 Drawing Sheets

(56) References Cited

U.S. PATENT DOCUMENTS

| | | |
|---|---|---|
| 8,495,143 B2 | 7/2013 | Zhou et al. |
| 8,533,203 B2 | 9/2013 | Chaudhuri et al. |
| 8,620,699 B2 | 12/2013 | Svendsen |
| 8,645,373 B2 | 2/2014 | Knight et al. |
| 8,666,994 B2 | 3/2014 | Ogilvy et al. |
| 8,669,457 B2 | 3/2014 | Ringewald et al. |
| 8,712,926 B2 | 4/2014 | Behal et al. |
| 8,782,061 B2 | 7/2014 | Agrawal et al. |
| 8,966,394 B2 | 2/2015 | Gates et al. |
| 9,158,754 B2 | 10/2015 | Whitman et al. |
| 9,177,065 B1 * | 11/2015 | Ben-Yair ........... G06F 17/30867 |
| 9,384,275 B2 | 7/2016 | Stefik |
| 2004/0172267 A1 | 9/2004 | Patel et al. |
| 2006/0168340 A1 | 7/2006 | Heller et al. |
| 2007/0157797 A1 | 7/2007 | Hashizume et al. |
| 2008/0059461 A1 | 3/2008 | Brock et al. |
| 2008/0147711 A1 | 6/2008 | Spiegelman et al. |
| 2008/0208775 A1 | 8/2008 | Vossen et al. |
| 2009/0210415 A1 | 8/2009 | Martin et al. |
| 2010/0030772 A1 | 2/2010 | Zilca et al. |
| 2010/0161623 A1 | 6/2010 | Torbjornsen |
| 2010/0191689 A1 | 7/2010 | Cortes et al. |
| 2010/0205222 A1 | 8/2010 | Gajdos et al. |
| 2010/0293179 A1 | 11/2010 | Chaudhuri et al. |
| 2011/0213769 A1 | 9/2011 | Handman et al. |
| 2011/0282856 A1 | 11/2011 | Ganti et al. |
| 2012/0023403 A1 | 1/2012 | Herberger et al. |
| 2012/0036130 A1 | 2/2012 | Light et al. |
| 2012/0041969 A1 | 2/2012 | Priyadarshan et al. |
| 2012/0123854 A1 | 5/2012 | Anderson et al. |
| 2012/0136750 A1 | 5/2012 | Gronow et al. |
| 2012/0166436 A1 | 6/2012 | Kalasapur et al. |
| 2012/0246174 A1 * | 9/2012 | Spears ................. G06Q 30/02 707/749 |
| 2012/0278342 A1 | 11/2012 | Purdy |
| 2013/0262469 A1 | 10/2013 | Whitman |
| 2013/0262471 A1 | 10/2013 | Whitman et al. |
| 2014/0046945 A1 | 2/2014 | Deolalikar et al. |
| 2014/0114985 A1 | 4/2014 | Mok et al. |
| 2014/0136554 A1 * | 5/2014 | Moradi ............ G06F 17/30029 707/754 |
| 2014/0195544 A1 | 7/2014 | Whitman |
| 2014/0222422 A1 | 8/2014 | Sarikaya et al. |
| 2014/0279817 A1 | 9/2014 | Whitman et al. |
| 2015/0106444 A1 * | 4/2015 | Schneider ......... G06F 17/30772 709/204 |
| 2016/0034757 A1 * | 2/2016 | Chhichhia .......... G06K 9/00463 382/206 |

FOREIGN PATENT DOCUMENTS

| | | |
|---|---|---|
| EP | 2207348 A2 | 7/2010 |
| KR | 1020090046353 A | 5/2009 |
| WO | 2010087909 A1 | 8/2010 |
| WO | 2011032069 A2 | 3/2011 |
| WO | 2012107762 A1 | 8/2012 |

OTHER PUBLICATIONS

Cross-domain recommender Systems, IEEE-2011, Paolo Cremonesi, Antoini Tripodi, and Roberto Turrin.

Y. Shi et al., "Tags as Bridges between Domains: Improving Recommendation with Tag-Induced Cross-Domain Collaborative Filtering", User Modeling, Adaption and Personalization, Springer Berlin Heidelberg; Berlin; Jul. 11, 2011, pp. 306-316.

* cited by examiner

SYSTEM, METHODS AND COMPUTER PRODUCTS FOR DETERMINING AFFINITY TO A CONTENT CREATOR

BACKGROUND OF THE INVENTION

I. Field

This disclosure relates generally to digital content distribution platforms, and more particularly to systems, methods, and computer products for quantifying an affinity of a user account on a digital content distribution platform to a content creator hosting content on the digital content distribution platform.

II. Related Art

Digital content distribution platforms have allowed consumers unprecedented access to large catalogs of digital items (i.e. digital objects) such as digital media in the form of movies, TV shows and songs, documents such as e-books and scholarly articles, and interactive content such as video games and mobile applications.

Users typically access these platforms (e.g. music or video streaming services) using a personal user account and are given a number of ways in which to interact with content from a catalog, including, for example, the ability to purchase or stream digital items, to add a content creator (e.g. a musical artist, publisher, movie producer or author) to a list of favorite content creators, to follow or subscribe to a mailing list of a content creator, to add digital items to a playlist, to download a digital item for offline access, or to share a digital item with other users on the platform or on external platforms such as Internet-based social networks and personal blogs.

Data from these interactions can be collected over time and can be used to provide additional features to the user such as content recommendation. For example, a profile can be built from interaction data and maintained for each user account, providing insights into the preferences of each user for certain types of digital items or certain types of content creators. The profile can then be used to recommend digital items to the user. In addition, interaction data provides each user with a valuable historical record of their activity on the platform and of their most commonly accessed content (e.g. top played songs, top played artists, favorite television shows, etc.).

BRIEF DESCRIPTION

From the perspective of a content creator, being able to use interaction data to identify particular user accounts that have a meaningful affinity for the digital content hosted by the content creator could prove immensely valuable. By identifying the most meaningful "fans" or enthusiasts of their content among the many users of a platform, content creators could, for example, more effectively deliver targeted advertisements to user accounts or more purposefully connect with their most valuable users.

However, interaction data alone can provide only limited insight into whether a user account has any meaningful affinity to a content creator. In fact, the enormous volume of interaction data collected and the vastness of a typical content catalog add an immense level of complexity to this issue.

For example, a simple comparison of the number of times two user accounts accessed a digital item does not take into account any of the contextual factors required in order to compare the two user accounts for the actual or meaningful affinity each has for the digital item. These factors may include, for example, a comparison of the total activity of each user on the platform, a comparison of the activity of each user outside of the platform, the overall popularity of the digital item, the overall popularity of the content creator of the digital item, or the different values associated with different types of interactions (e.g. one user sharing an item on a social media website might be more meaningful than the other user simply downloading the item).

Although the wealth of interaction data collected on these platforms has created unique new opportunities for content creators to understand user affinity or so-called "fandom", there has yet to be a technical solution for quantifying affinity to a content creator using this interaction data using hardware, software or a combination of both.

The example embodiments described herein address the foregoing difficulties by providing methods, systems and computer program products for computing affinity scores for a plurality of user accounts, each affinity score quantifying affinity of a user account to one of a plurality of content creators hosting one or more digital objects in a content hosting platform. Computing an affinity score includes collecting interaction data for the user account corresponding to the content creator, normalizing the collected interaction data using the total activity data of the user account on the content hosting platform, and generating the affinity score using the normalized interaction data and attribute data associated with the content creator.

In one example embodiment, when normalizing the collected interaction data, the interaction data can also be normalizing using activity data of one or more other user accounts.

In another example embodiment, a ranking of the affinity score against affinity scores of other user accounts corresponding to the content creator can be generated. The user account can then be categorized into one or more groups using the affinity score or the ranking generated for the affinity score. For example, one of the one or more groups can include only user accounts having affinity scores that increased at least a threshold amount over a time period.

In another example embodiment, the affinity score can be periodically updated using a most recent activity data of the user account corresponding to the content creator.

In yet another embodiment, at least a portion of the total activity data for the user account can be collected from at least one data source external to the content hosting platform.

BRIEF DESCRIPTION OF THE DRAWINGS

The features and advantages of the example embodiments of the invention presented herein will become more apparent from the detailed description set forth below when taken in conjunction with the following drawings.

Identical reference numerals used in different figures identify the same elements, and thus a detailed description of those elements may not be provided herein for each separate figure.

DETAILED DESCRIPTION

The example embodiments described herein provide systems, methods and computer products for determining affinity to a content creator, which are now described herein in terms of an example method for computing an affinity score quantifying affinity of a user account to a content creator for use with a content distribution platform. This description is not intended to limit the application to the example embodiments presented herein. In fact, after reading the following description, it will be apparent to one skilled in the relevant art(s) how to implement the following example embodiments in alternative embodiments (e.g., in domains outside of music or video distribution platforms).

Figure 1:
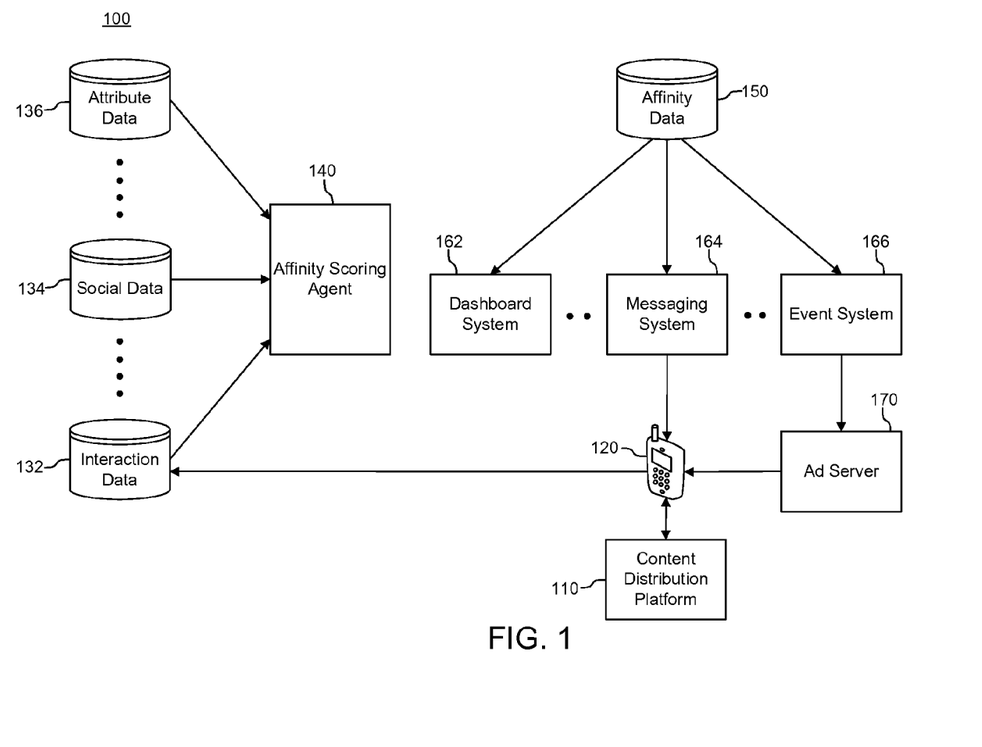
FIG. 1 is an overview of a system for determining affinity of a user account to a content creator according to an example embodiment of the invention.

FIG. 1 is an overview of a system 100 for determining affinity of a user account to a content creator according to an example embodiment of the invention.

Content distribution platform 110 is a platform for distributing digital content to an end-user on client device 120 by delivering digital content or digital objects, including, but not limited to, web objects (e.g. text, graphics and scripts), downloadable objects (e.g. media files, software, documents), applications (e.g. e-commerce, portals), live streaming media, on-demand streaming media, and social media content to client device 120 communicatively coupled to content distribution platform 110 (e.g., via a network; not shown).

Content distribution platform 110 may include a large distributed system of servers deployed in multiple data centers across the Internet (i.e. a content distribution network). It may, for example, include an interconnected system of cache servers that use geographical proximity as a criterion for delivering digital content with optimized performance and availability. Alternatively, content distribution platform 110 may use any other known or future known technologies for hosting and distributing digital content to a remote client device, such as peer-to-peer file-sharing technologies.

Content distribution platform 110 serves digital objects from a catalog of content, such as a music or video library. The catalog may include digital objects generated by a variety of content providers such as media companies, artists, publishers or e-commerce vendors. These content providers may include the operator of the content distribution platform itself or third-party content creators.

Client device 120 is computer hardware or software that accesses services and digital objects made available by content distribution platform 110. The client device 120 is communicatively coupled to the content distribution platform 110 by a network, such as through a connection using cable, fiber optic, satellite or wireless communication mechanisms or other known or future known communication mechanisms.

Client device 120 may also have means to display, execute or present digital objects to an end-user, such as a display device or audio device.

Client device 120 can include general purpose computer hardware in the form of a desktop computer, mobile device or set-top box. Alternatively, client device 120 can include a stand-alone device for content consumption such as a portable media player, radio, television or computer monitor. Client device 120 may also be in the form of software installed locally on a computer or accessed through the Internet, such as a web-based application (e.g. desktop or web-based media streaming software).

Client device 120 is configured to allow the end-user a number of different interactions with digital objects. For example, client device 120 may include e-commerce and payment features that allow a user to purchase a digital object. Client device 120 may also allow for social interactions with data objects or content creators such as the ability for the user to add a digital object or a profile of a content creator to a list of favorite items, to share a digital item with other users of the content distribution platform 110 or to share a digital item with users on external platforms such as social media websites and personal blogs, or to add digital objects to a personalized playlist.

Client device 120 is also configured to manage one or more user accounts through a user account system of content distribution platform 110. Each user account is identified by a username. In one example embodiment, a user account system allows an end-user to authenticate to client device 120 and to be granted authorization to access the services and contents provided by content distribution platform 110. Client device 120 can allow multiple end-users to authenticate to client device 120 each with their own user account. Each user account is associated with a corresponding home directory or partition of memory on the client device which is used to store files pertaining exclusively to the activities of that end-user. This directory or partition can be protected from access by other users. Each user account may contain a user profile, which includes information about the end-user, end-user selected settings, or data collected from interactions performed by the end-user.

Once an end-user has been authenticated to or by client device 120 using a user account, interaction data are collected including activities performed by an end-user using the user account on content distribution platform 110. These interaction data are stored in interaction data storage 132. Interaction data storage 132 can be communicatively coupled to content distribution platform 110. Interaction data storage 132 can be a single server or a distributed file system such as, for example, any known or future known distributed file system and associated software framework such as the Apache Hadoop Distributed File System (HDFS) and the Apache MapReduce framework.

In addition to interaction data storage 132, the system 100 of FIG. 1 includes a number of other data sources including, but not limited to, social data storage 134 and attribute data storage 136.

Social data storage 134 stores social media data associated with an end-user such as activity data from one or more Internet-based social networks (e.g. Facebook, Twitter, etc.). Content distribution platform 110 allows an end-user to authenticate to and link their user account on content distribution platform 110 to a user profile from an Internet-based social network. The data may include information on any known or future known social interactions enabled by a social network such as sharing of user-generated content, "favoriting" or "liking" a digital object, or messaging other user profiles on an Internet-based social network.

Attribute data storage 136 stores data describing attributes of one or more content providers. This can include, but is not limited to, cultural data on content providers, editorial content, or popularity data on content providers.

Affinity scoring agent 140 is configured to collect data from data sources including, for example, interaction data storage 132, social data storage 134 and attribute data storage 136 and to generate an affinity score that quantifies the affinity of a particular user account to one of the content providers serving content on content distribution platform 110. The process by which affinity scoring agent 140 generates an affinity score is described more fully below in view of FIGS. 3 and 4.

Affinity scoring agent 140 stores the generated affinity scores in user-affinity data storage 150, which in turn is accessible by a plurality of external systems including, but not limited to, dashboard system 162, messaging system 164, and event system 164.

Dashboard system 162 is a management system for content providers and allows a content provider to view an overview of the content hosted they are hosting on content distribution platform 110 and the activity data of user accounts that have interacted with the content hosted by the content provider on content distribution platform 110. In example embodiments described herein, dashboard system 162 can access affinity scores stored in affinity data storage 162.

The dashboard system 162 is configured to both display the affinity data and to allow a content provider to manipulate the affinity data. It can also be configured to allow the content provider to interact with content distribution platform 110 in a number of ways, such as by serving targeted advertisements to user accounts or modifying hosted digital objects in response to the displayed or manipulated affinity data.

Messaging system 164 is a system for content providers to communicate information to end-users, for example, by transmitting messages to user accounts of content distribution platform 110. In one example embodiment, messaging system 164 allows for both targeted and mass-mail messaging. In example embodiments described herein, the messaging system can access affinity scores stored in affinity data storage 150. The messaging system 164 can display the affinity data and allows a content provider to manipulate the affinity data. In one embodiment, messaging system 164 allows the content provider to message user accounts of content distribution platform 110 by, for example, messaging a single user account in response to the displayed or manipulated affinity data.

Event system 166 is a system for content providers to promote events to user accounts of the content distribution platform 110. For example, event system 166 may include a concert management system (not shown) that allows a music producing content provider to list or promote concert events to end-users. The event system 166 allows a content provider to provide, for example, date, time and location data for events to end-users, for example, by transmitting messages to user accounts of content distribution platform 110.

Advertisement ("ad") server 170 is a system for content providers to display or present advertisements on client device 120. Ad server 170 includes a computer server, such as a web server backed by a database server, that stores advertising content used in marketing content providers and their content, and delivers advertisements to end-users of content distribution platform 110. The advertising content stored on ad server 170 is constantly updated so that new advertisements are displayed or presented to end-users when they engage with content distribution platform 110. The advertisements can, for example, be in the form of a display ad displayed on a display device of client device 120 or in the form of an audio ad presented through an audio device of client device 120.

Figure 2:
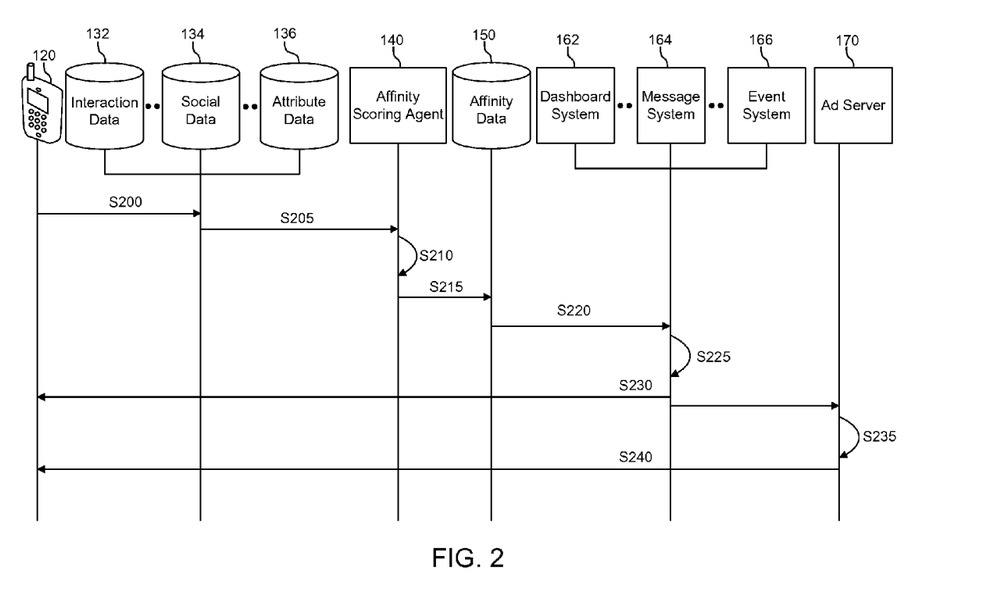
FIG. 2 is a sequence diagram illustrating a process for determining affinity of a user account to a content creator according to an example embodiment of the invention.

FIG. 2 is a sequence diagram illustrating a process for determining affinity of a user account to a content creator according to an example embodiment of the invention. The process can be performed, for example, by the system of FIG. 1.

In step S200, activity data including interactions performed by an end-user using a user account on client device 120 are logged and stored in interaction data storage 132.

In step S205, data from interaction data storage 132 as well as various other data sources such as, for example, social data storage 134 and attribute storage 136 are sent to affinity score agent 140.

In instances where the data sources include distributed or clustered file systems, a batch processing of this data is performed by affinity score agent 140 in step S210 using any known or future known programming model for processing and generating large data sets using a parallel, distributed algorithm on a computer cluster, such as the Apache MapReduce framework. Any known library for the programming model can be used, for example, the Apache Crunch framework for writing, testing and running MapReduce pipelines.

Affinity score agent 140 generates an affinity score that quantifies the affinity of a particular user account to one of the content providers serving content on content distribution platform 110 using the batched processed data. Affinity score agent 140 may also compute a ranking of an affinity score or a categorization of an affinity score. The processes by which affinity score agent 140 generates an affinity score, ranks an affinity score and categorizes an affinity score are described more fully below in view of FIGS. 3 and 4.

In step S215, the affinity score, ranking and/or categorizations (i.e. affinity data) generated by affinity score agent 140 are stored in user-affinity database 150.

In step S220, the affinity data stored in user-affinity database 150 are accessed by external systems including, but not limited to, dashboard system 162, messaging system 164, and event system 166.

In step S225, the external systems (162, 164, and 166) enable a content provider (not shown) to access, display, manipulate or otherwise act upon the affinity data received from user-affinity database 150.

In step S230, the external systems (162, 164, and 166) enable a content provider to send targeted data to client device 120 in response to the affinity data or manipulations of the affinity data. These targeted data can include, but are not limited to, targeted messages to a user account or the "following" or "favoriting" of a user account (e.g. the labeling or listing of a user account as a "follower", "favorite" or "fan" of a content provider). Alternatively, in step S230, the external systems (162, 164, and 166) enable a content provider to send data to an external server in response to the affinity data or manipulations of the affinity data, such as to ad server 170.

In step S235, an advertising line item is generated by ad server 170 in response to the affinity data received from one or more of the plurality of external systems, for example, event system 164. In one embodiment, ad server 170 generates the advertising line item locally in response to the affinity data and user account data from client device 120. Alternatively, ad server 170 may be configured to generate a template line item to send to client device 120. The template line item may include instructions for the client device to fill the template line item in response to affinity data accessed by client device 120 directly from user-affinity database 150 and/or user account data stored on client device 120.

In step S240, ad server 170 delivers the advertising line item to a user account on client device 120.

Figure 3:
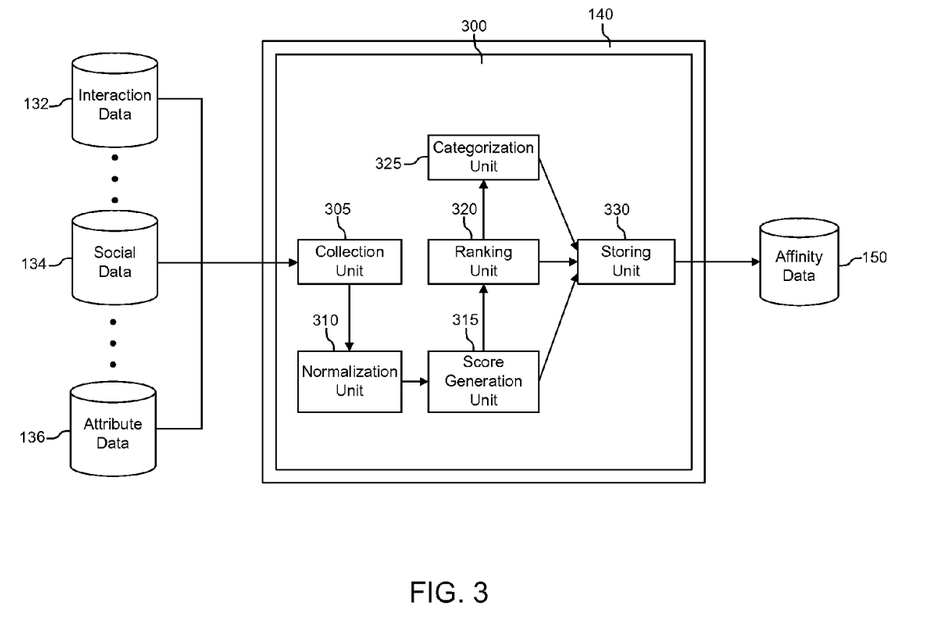
FIG. 3 is a block diagram illustrating a device configured to compute an affinity score for a user account according to an example embodiment of the invention.

FIG. 3 is a block diagram for explaining affinity scoring agent 140, illustrated in FIG. 3 as a device configured to compute an affinity score for a user account.

As shown in FIG. 3, affinity scoring agent 140 includes computing unit 300 configured to compute affinity scores for a plurality of user accounts. Each affinity score quantifies the affinity of a user account to one of a plurality of content creators of one or more digital objects hosted in the content hosting platform.

Computing unit 300 includes collection unit 305, which is configured to collect user account data corresponding to one or more content creators from a variety of data sources, including, but not limited to, interaction data storage 132, social data storage 134 or attribute data storage 136. These data sources can include data sources external to the content hosting platform 110.

Also included in computing unit 300 is normalization unit 310 configured to normalize the collected user account data corresponding to a particular content creator using the total activity data for the user account and attribute data of the content creator. Normalization unit 310 can also be configured to normalize the collected user account data using activity data of one or more other user accounts.

Computing unit 300 further includes score generating unit 315 configured to generate an affinity score using the normalized user account data and storing unit 330 configured to store the generated affinity score in user-affinity database 150. The process steps of normalizing the collected user account data and generating the affinity score are explained more fully below, in view of FIG. 4.

In the example embodiment of FIG. 3, computing unit 300 also includes ranking unit 320 configured to rank the generated affinity score against affinity scores of one or more other user accounts corresponding to the content creator and categorization unit 325 configured to categorize the user account into one or more groups using the affinity score or the ranking of the affinity score produced by the ranking unit.

Storing unit 330 may be further configured to store the ranking and categorizations of the affinity score in user-affinity database 150.

Computing unit 300 and each of the components included therein may be further configured to update the affinity score periodically using the most recent activity data of a user account corresponding to the content creator.

Figure 4:
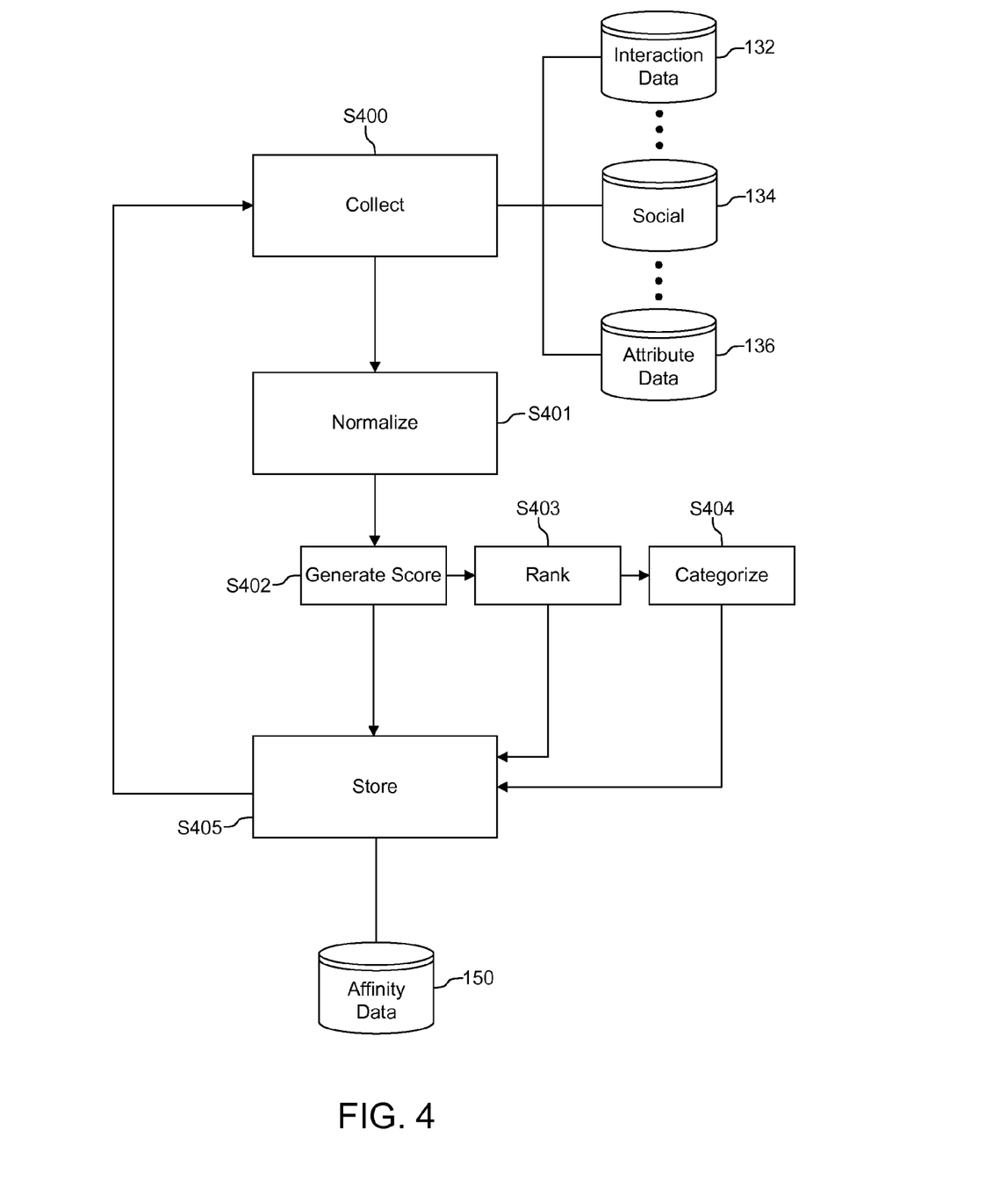
FIG. 4 illustrates a flow diagram of a process for computing an affinity score for a user account according to an example embodiment of the invention.

FIG. 4 illustrates a flow diagram of a process for computing an affinity score for a user account according to an example embodiment of the invention. The process can be performed, for example, by a specially configured device such as affinity scoring agent 140.

Briefly, in FIG. 4, an affinity score is computed for a user account, where the affinity score quantifies an affinity of the user account to a content creator of one or more digital objects hosted in a content hosting platform. The affinity score is computed by collecting interaction data for the user account corresponding to the content creator, normalizing the collected interaction data using a total activity data of the user account on the content hosting platform and attribute data associated with the content creator, and generating the affinity score using the normalized interaction data.

In step S400, data are collected from interaction data storage 132 as well as various other data sources, for example social data storage 134 and attribute storage 136 and are sent to affinity score agent 140.

A batch processing of this data is performed by affinity score agent 140 in step S400 using any known or future known programming model for processing and generating large data sets using a parallel, distributed algorithm on a computer cluster, such as the Apache MapReduce framework. For example, a batched processing of the data may be performed on a periodic basis (e.g. daily, weekly or monthly). Any known library for the programming model can be used, for example, the Apache Crunch framework for writing, testing and running MapReduce pipelines.

In step S401, one or more values indicating an affinity of the user account for a content provider are normalized. These values can include any type of value that may signal an affinity or preference for a digital object hosted by the content provider; for example: data on the number of times a user account streamed or downloaded a digital object or the number of times a user account shared a link to a digital object.

The values are normalized using any known statistical normalization techniques using data collected from one or more of the plurality of data sources (e.g. interaction data storage 132, social data storage 134, or attribute storage 136).

These normalization techniques can include any known or future known techniques of performing weighted adjustments of the values that allow for the comparison of corresponding normalized values for different data sources. Example normalizations may include, but are not limited to, performing a weighted adjustment of interaction data from interaction data storage 132 in accordance with the type of interaction performed; for example: weighting the significance given to streaming a digital object differently, compared to adding the digital object to a playlist.

As another example, interaction data for a single user account corresponding to a single content provider could be adjusted using the total interaction data collected for the user account across all content providers.

Collected data may also be normalized using data from external or alternative data sources. For example, interaction data collected from interaction data storage 132 may be normalized using data collected from social data storage 134 or attribute data storage 136.

In step S402, an affinity score is generated using the normalized data. The affinity score can be any single value that serves to quantify an affinity of an individual user account to a single content provider. This score can then be compared between user accounts for a single content provider or between content providers for a single user account.

In step S403, the generated affinity score may optionally be ranked against affinity scores of one or more other user accounts corresponding to the content creator. This ranking step may result in a numerical ranking of the affinity score which can be stored, for example, in user-affinity database 150.

In step S404, the user account may be categorized into one or more groups according to the generated affinity score and/or the ranking generated for the affinity score. This categorization step may result in the generation of data in the form of one or more category labels for each affinity score which can also be stored, for example, in user-affinity database 150. As one example, a category label can be generated for an affinity score that has increased at least a threshold amount over a time period. In the example of a music streaming service, this category label might label the user account as an "emerging fan" or "new fan". Alternative category labels might label a user account as a "hardcore fan", a "lapsed fan", etc., when desired and/or meaningful qualifications of an affinity of a user account for a content provider are identified using the affinity score or a change of an affinity score over a time period.

In step S405, the generated affinity score, ranking and or categorization is stored in user-affinity database 150, which in turn is accessible by a plurality of external systems including, but not limited to, dashboard system 162, messaging system 164, and event system 166.

Steps S400 through S405 can be repeated periodically to generate an updated affinity score.

Figure 5:
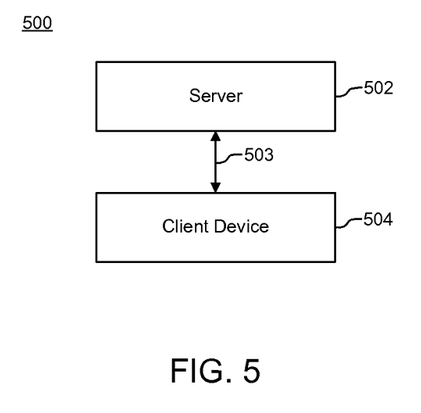
FIG. 5 is a block diagram of an example client-server data system configured in accordance with the principles of the invention.

FIG. 5 is a block diagram of an example client-server data system 500 configured in accordance with the principles of the invention. Data system 500 can include server 502 and client device 504. In some embodiments, data system 500 can include multiple servers 502, multiple client devices 504, or both multiple servers 502 and multiple client devices 504. For simplicity, only one server 502 and one client device 504 are illustrated.

Server 502 may include any suitable types of servers that can store and provide data to client device 504 (e.g., file server, database server, web server, or media server). Server 502 can store media objects and other data (e.g., metadata associated with the content of the media objects), and server 502 can receive data download requests from client device 504. For example, server 502 can receive requests to obtain the media objects, such as one or more audio or video tracks or previews or loops of those audio or video tracks such as those described above. Responsive thereto, server 502 can locate and provide the requested songs, previews or loops as well as associated metadata, such as attributes related to the media object (e.g., genre, artist, album title, album cover art, release date, and the like), media recommendations, and the like.

In some embodiments, server 502 can obtain and process data from one or more client devices 504. For example server 502 can receive from claim device 504 requests for specific previews or loops.

Server 502 can communicate with client device 504 over communications link 503. Communications link 503 can include any suitable wired or wireless communications link, or combinations thereof, by which data may be exchanged between server 502 and client 504. For example, communications link 503 can include a satellite link, a fiber-optic link, a cable link, an Internet link, or any other suitable wired or wireless link. Communications link 503 may enable data transmission using any suitable communications protocol supported by the medium of communications link 503. Such communications protocols may include, for example, Wi-Fi (e.g., a 802.11 protocol), Ethernet, Bluetooth™, radio frequency systems (e.g., 900 MHz, 2.4 GHz, and 5.6 GHz communication systems), infrared, TCP/IP (e.g., and the protocols used in each of the TCP/IP layers), HTTP, Bit Torrent, FTP, RTP, RTSP, SSH, any other communications protocol, or any combination thereof.

Client device 504 can include any electronic device capable of playing audio or video (e.g., music, videos, podcasts, and interviews) to a user and may be operative to communicate with server 502. For example, client device 504 can include a portable media player, a cellular telephone, pocket-sized personal computers, a desktop computer, a laptop computer, and any other device capable of communicating via wires or wirelessly (with or without the aid of a wireless enabling accessory device).

Figure 6:
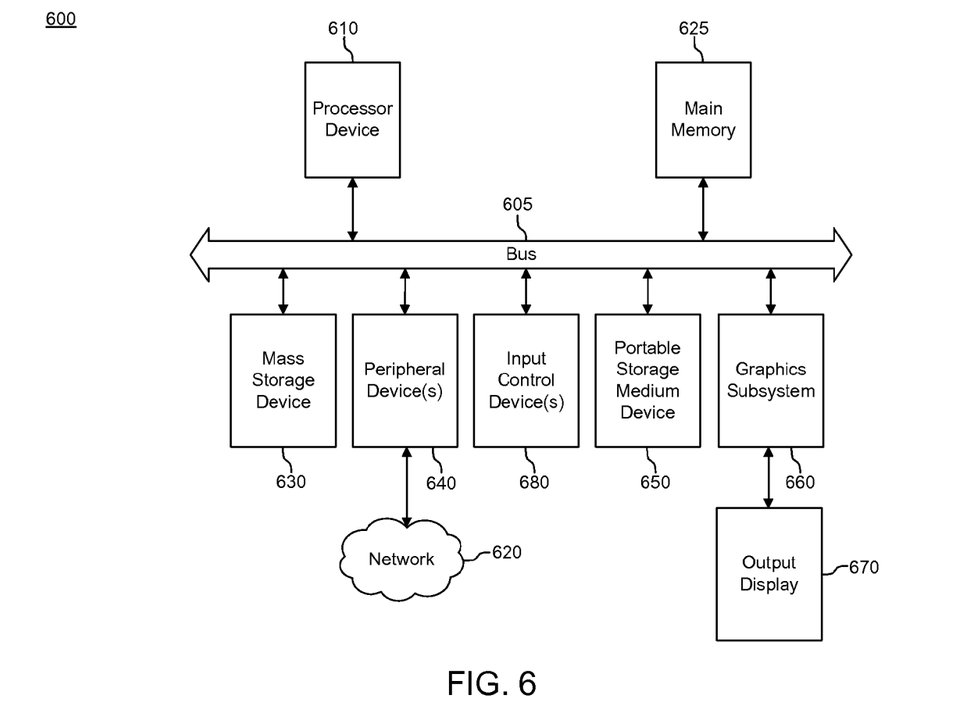
FIG. 6 is a block diagram of a general and/or special purpose computer, which may be a general and/or special purpose computing device, in accordance with some of the example embodiments of the invention.

FIG. 6 is a block diagram of a general and/or special purpose computer 600, which may be a general and/or special purpose computing device, in accordance with some of the example embodiments of the invention. The computer 600 may be, for example, the same or similar to client device (e.g., 504, FIG. 5), a user computer, a client computer and/or a server computer (e.g., 502, FIG. 5), among other things, or can be a device not operative to communicate with a server.

The computer 600 may include without limitation a processor device 610, a main memory 625, and an interconnect bus 605. The processor device 610 may include without limitation a single microprocessor, or may include a plurality of microprocessors for configuring the computer 600 as a multi-processor system. The main memory 625 stores, among other things, instructions and/or data for execution by the processor device 610. The main memory 625 may include banks of dynamic random access memory (DRAM), as well as cache memory.

The computer 600 may further include a mass storage device 630, peripheral device(s) 640, portable non-transitory storage medium device(s) 650, input control device(s) 680, a graphics subsystem 660, and/or an output display interface 670. For explanatory purposes, all components in the computer 600 are shown in FIG. 6 as being coupled via the bus 605. However, the computer 600 is not so limited. Devices of the computer 600 may be coupled via one or more data transport means. For example, the processor device 610 and/or the main memory 625 may be coupled via a local microprocessor bus. The mass storage device 630, peripheral device(s) 640, portable storage medium device(s) 650, and/or graphics subsystem 660 may be coupled via one or more input/output (I/O) buses. The mass storage device 630 may be a nonvolatile storage device for storing data and/or instructions for use by the processor device 610. The mass storage device 630 may be implemented, for example, with a magnetic disk drive or an optical disk drive. In a software embodiment, the mass storage device 630 is configured for loading contents of the mass storage device 630 into the main memory 625.

The portable storage medium device 650 operates in conjunction with a nonvolatile portable storage medium, such as, for example, a compact disc read only memory (CD-ROM), to input and output data and code to and from the computer 600. In some embodiments, the software for storing information may be stored on a portable storage medium, and may be inputted into the computer 600 via the portable storage medium device 650. The peripheral device(s) 640 may include any type of computer support device, such as, for example, an input/output (I/O) interface configured to add additional functionality to the computer 600. For example, the peripheral device(s) 640 may include a network interface card for interfacing the computer 600 with a network 620.

The input control device(s) 680 provide a portion of the user interface for a user of the computer 600. The input control device(s) 680 may include a keypad and/or a cursor control device. The keypad may be configured for inputting alphanumeric characters and/or other key information. The cursor control device may include, for example, a handheld controller or mouse, a trackball, a stylus, and/or cursor direction keys. In order to display textual and graphical information, the computer 600 may include the graphics subsystem 660 and the output display 670. The output display 670 may include a display such as a CSTN (Color Super Twisted Nematic), TFT (Thin Film Transistor), TFD (Thin Film Diode), OLED (Organic Light-Emitting Diode), AMOLED display (Active-matrix organic light-emitting diode), and/or liquid crystal display (LCD)-type displays. The displays can also be touchscreen displays, such as capacitive and resistive-type touchscreen displays.

The graphics subsystem 660 receives textual and graphical information, and processes the information for output to the output display 670.

Each component of the computer 600 may represent a broad category of a computer component of a general and/or special purpose computer. Components of the computer 600 are not limited to the specific implementations provided here.

Software embodiments of the example embodiments presented herein may be provided as a computer program product, or software, that may include an article of manufacture on a machine-accessible or machine-readable medium having instructions. The instructions on the non-transitory machine-accessible machine-readable or computer-readable medium may be used to program a computer system or other electronic device. The machine or computer-readable medium may include, but is not limited to, floppy diskettes, optical disks, CD-ROMs, and magneto-optical disks or other types of media/machine-readable medium suitable for storing or transmitting electronic instructions. The techniques described herein are not limited to any particular software configuration. They may find applicability in any computing or processing environment. The terms "computer-readable", "machine-accessible medium" or "machine-readable medium" used herein shall include any medium that is capable of storing, encoding, or transmitting a sequence of instructions for execution by the machine and that causes the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Portions of the example embodiments of the invention may be conveniently implemented by using a conventional general purpose computer, a specialized digital computer and/or a microprocessor programmed according to the teachings of the present disclosure, as is apparent to those skilled in the computer art. Appropriate software coding may readily be prepared by skilled programmers using the teachings of the present disclosure.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation a floppy disk, a mini disk, an optical disc, a Blu-ray Disc, a DVD, a CD or CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer readable media further include software for performing example aspects of the invention, as described above.

Included in the programming and/or software of the general and/or special purpose computer or microprocessor are software modules for implementing the procedures described above.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

In addition, it should be understood that the FIGS. 1-6 are presented for example purposes only. The architecture of the example embodiments presented herein is sufficiently flexible and configurable, such that it may be utilized and navigated in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A computer-implemented method, comprising the steps of:
   computing, by a processing device, affinity scores for a plurality of user accounts, each affinity score quantifying affinity of a user account to one of a plurality of content creators of one or more digital objects hosted in a content hosting platform, wherein computing an affinity score corresponding to the user account includes:
   collecting, from a client device communicatively coupled to the content hosting platform, interaction data identifying activity of a user associated with the user account corresponding at least to a content creator of one or more digital objects hosted in the content hosting platform,
   collecting, from a plurality of data sources, attribute data associated with the content creator including at least cultural data,
   associating activities of the user account on the content hosting platform with weights based on a type of the respective activity, wherein a weight of a first type of activity is different from a weight of a second type of activity;
   normalizing the interaction data based on the activity of the user account on the content hosting platform, the attribute data associated with the content creator, and the weights associated by the associating, and generating the affinity score using the normalized interaction data;

storing, in a database, the affinity scores; and sending, to a device associated with one of the plurality of user accounts, targeted data based on the affinity score of the respective user account with one of the plurality of content creators.

2. The method according to claim 1, wherein the step of normalizing the collected interaction data further includes normalizing the collected interaction data using activity data of one or more other user accounts.

3. The method according to claim 1 further including a step of generating a ranking of the stored affinity score against affinity scores of one or more other user accounts corresponding to the content creator.

4. The method according to claim 3 further including a step of categorizing the user account into one or more groups using the affinity score or the ranking generated for the affinity score.

5. The method according to claim 4, wherein one of the one or more groups includes only user accounts having affinity scores that increased at least a threshold amount over a time period.

6. The method according to claim 1 further including a step of periodically updating the affinity score using a most recent activity data of the user account corresponding to the content creator.

7. The method according to claim 1, wherein at least a portion of the total activity data for the user account is collected from at least one data source external to the content hosting platform.

8. A device configured to determining affinity of a user account to a content creator, the device comprising:

a computing unit, including a processor, configured to compute affinity scores for a plurality of user accounts, each affinity score quantifying affinity of a user account to one of a plurality of content creators of one or more digital objects hosted in a content hosting platform, wherein the computing unit further includes:

a collection unit configured to collect:

from a client device communicatively coupled to the content hosting platform, interaction data identifying activity of a user associated with the user account corresponding at least to a content creator of one or more digital objects hosted in the content hosting platform; and from a plurality of data sources, attribute data associated with the content creator including at least cultural data, a normalization unit configured to (1) associate activities of the user account on the content hosting platform with weights based on a type of the respective activity, wherein a weight of a first type of activity is different from a weight of a second type of activity, and (2) normalize the collected interaction data using a total activity data of the user account on the content hosting platform attribute data associated with the content creator, and the associated weights, and a score generation unit configured to generate the affinity score using the normalized interaction data, wherein the computing unit is further configured to store the affinity scores in a database, and to send, to a device associated with one of the plurality of user accounts, targeted data based on the affinity score of the respective user account with one of the plurality of content creators.

9. The device according to claim 8, wherein the normalization unit is further configured to normalize the collected interaction data using activity data of one or more other user accounts.

10. The device according to claim 8 further including a ranking unit configured to rank the affinity score against affinity scores of one or more other user accounts corresponding to the content creator.

11. The device according to claim 10 further including a categorization unit configured to categorize the user account into one or more groups using the ranking of the affinity score produced by the ranking unit.

12. The device according to claim 11, wherein one of the one or more groups includes only user accounts having affinity scores that increased at least a threshold amount over a time period.

13. The device according to claim 8, wherein the computing unit is further configured to update the affinity score periodically using a most recent activity data of the user account corresponding to the content creator.

14. The device according to claim 8, wherein the collection unit is configured to collect at least a portion of the total activity data for the user account from at least one data source external to the content hosting platform.

15. A non-transitory computer-readable medium having instructions stored therein that in response to execution by a device cause the device to perform operations comprising:

computing affinity scores for a plurality of user accounts, each affinity score quantifying affinity of a user account to one of a plurality of content creators of one or more digital objects hosted in a content hosting platform, wherein computing an affinity score corresponding to the user account includes:

collecting, from a client device communicatively coupled to the content hosting platform, interaction data identifying activity of a user associated with the user account corresponding to a content creator of one or more digital objects hosted in the content hosting platform, collecting, from a plurality of data sources, attribute data associated with the content creator including at least cultural data, associating activities of the user account on the content hosting platform with weights based on a type of the respective activity, wherein a weight of a first type of activity is different from a weight of a second type of activity;

normalizing the interaction data based on the activity of the user account on the content hosting platform, the attribute data associated with the content creator, and the weights associated by the associating, and generating the affinity score using the normalized interaction data;

storing, in a database, the affinity scores; and sending, to a device associated with one of the plurality of user accounts, targeted data based on the affinity score of the respective user account with one of the plurality of content creators.

16. The non-transitory computer-readable medium of claim 15, wherein the operation step of normalizing the collected interaction data further includes normalizing the collected interaction data using activity data of one or more other user accounts.

17. The non-transitory computer-readable medium of claim 15, wherein the operations further include a step of ranking the affinity score against affinity scores of one or more other user accounts corresponding to the content creator.

18. The non-transitory computer-readable medium of claim 17, wherein the operations further include a step of categorizing the user account into one or more groups using the step of ranking the affinity score among affinity scores of one or more other user accounts corresponding to the content creator.

19. The non-transitory computer-readable medium of claim 18, wherein one of the one or more groups includes only user accounts having affinity scores that increased at least a threshold amount over a time period.

20. The non-transitory computer-readable medium of claim 15, wherein the operations further include a step of periodically updating the affinity score using a most recent activity data of the user account corresponding to the content creator.

21. The non-transitory computer-readable medium of claim 15, wherein at least a portion of the total activity data for the user account is collected from at least one data source external to the content hosting platform.

* * * * *

UNITED STATES PATENT AND TRADEMARK OFFICE
CERTIFICATE OF CORRECTION

PATENT NO. : 9,798,823 B2
APPLICATION NO. : 14/943995
DATED : October 24, 2017
INVENTOR(S) : Cody et al.

Page 1 of 1

It is certified that error appears in the above-identified patent and that said Letters Patent is hereby corrected as shown below:

Column 13, Line 61, Claim 8: "platform attribute data associated" should read --platform, attribute data associated--

Signed and Sealed this
Eighteenth Day of September, 2018

Andrei Iancu
*Director of the United States Patent and Trademark Office*